(12) United States Patent
Tsai et al.

(10) Patent No.: US 9,116,864 B2
(45) Date of Patent: Aug. 25, 2015

(54) AUTOMATIC ABSTRACT DETERMINATION METHOD OF DOCUMENT CLUSTERING

(71) Applicant: Esobi Inc., George Town, KY (US)

(72) Inventors: Hong-Yang Tsai, Taipei (TW); Tzu-Teng Kao, Taipei (TW); Ko-Min Hsueh, Taipei (TW)

(73) Assignee: ESOBI INC., George Town (KY)

( * ) Notice: Subject to any disclaimer, the term of this patent is extended or adjusted under 35 U.S.C. 154(b) by 427 days.

(21) Appl. No.: 13/684,393

(22) Filed: Nov. 23, 2012

(65) Prior Publication Data
US 2013/0132827 A1   May 23, 2013

(30) Foreign Application Priority Data

Nov. 23, 2011   (TW) .............................. 100142996 A

(51) Int. Cl.
*G06F 17/21* (2006.01)
*G06F 17/30* (2006.01)

(52) U.S. Cl.
CPC ........ *G06F 17/212* (2013.01); *G06F 17/30705* (2013.01); *G06F 17/30719* (2013.01)

(58) Field of Classification Search
CPC .......................... G06F 17/212; G06F 17/30719
See application file for complete search history.

(56) References Cited

U.S. PATENT DOCUMENTS

| | | | |
|---|---|---|---|
| 6,766,287 B1 * | 7/2004 | Kupiec et al. ...................... 704/9 |
| 2003/0079185 A1 * | 4/2003 | Katariya et al. .............. 715/530 |
| 2005/0278314 A1 * | 12/2005 | Buchheit ........................... 707/3 |
| 2006/0200464 A1 * | 9/2006 | Gideoni et al. ................... 707/6 |
| 2009/0198667 A1 * | 8/2009 | Groeneveld et al. ............. 707/5 |
| 2010/0057710 A1 * | 3/2010 | Kanungo et al. ................. 707/5 |

* cited by examiner

*Primary Examiner* — Scott Baderman
*Assistant Examiner* — Asher Kells
(74) *Attorney, Agent, or Firm* — Muncy, Geissler, Olds & Lowe, P.C.

(57) ABSTRACT

An automatic abstract determination method of a document clustering is disclosed. The method includes forming a database for correspondingly packing and storing each document clustering including several abstract contents and body contents of subdocuments preloaded by a user as a document clustering process record file. Each document clustering process record file records the original abstract contents and the body contents of the subdocuments, and sets several determination values for analysis. When the user wishes to browse the contents of one document clustering, the method then determines whether or not to generate new abstract contents which is much more closer to the key points of the body contents to all of the subdocuments in the document clustering, according to the contents and values recorded in the corresponding document clustering process record file of the document clustering.

14 Claims, 9 Drawing Sheets

AUTOMATIC ABSTRACT DETERMINATION METHOD OF DOCUMENT CLUSTERING

CROSS-REFERENCE TO RELATED APPLICATIONS

This non-provisional application claims priority under 35 U.S.C. §119(a) on Patent Application No(s). 100142996 filed in Taiwan, R.O.C. on Nov. 23, 2011, the entire contents of which are hereby incorporated by reference.

BACKGROUND

1. Technical Field

The disclosure relates to an abstract processing method of documents, and in particular, to an automatic abstract determination method of document clustering.

2. Related Art

The quick growth of computers and the Internet makes the amount of information on the Internet increase rapidly. Generally, most of the users receive information through a specific portal website. The information means the articles, news, or on websites, and it may also be called digital documents. Forming the documents are really fast and the mounts of them are very large in recent years because of the widespread usage of digital technologies. Moreover, for refreshing the pages of all kinds of documents in real time, most of the providers of the documents (such as the portal websites) may process and display the abstract of the documents content, for allowing the user to browse more documents at the same time.

The conventional document abstract processing excerpts part of the body contents of the document. As described above, the amount of documents received by the portal website every day are very large. If the abstract processing is done by hand, it's a heavy burden for the manufacturers. Thus the providers of documents usually use automatic abstract processing manners which directly pick up the title or the first few words of the bodies content as the abstract of the document, and show them on the homepage. That is, although the conventional abstract processing manners may increase the number of displayed documents on the same page, the abstracts may simply be generated by capturing parts of the text of the bodies content. The abstracts may not be easily for users to understand the true content of the corresponding documents without determining whether or not the abstracts are close in relation to the key points of the corresponding documents. Therefore, the conventional manners do not match the needs of browsing abstracts with the key contents required by the users.

SUMMARY

Because of the aforementioned problems, the disclosure discloses an automatic abstract determination method of a document clustering, for pre-determining whether or not the original abstract contents of all the subdocuments of the document clustering are close in relation enough to the key points of the articles, when the user selects to browse the document clustering (which is the page contents of a website or channel contents of the website). By using the several determination steps of the disclosure, the disclosure may be able to analyze whether to generate abstracts (preferred abstract content) which is closer to the key points of articles according to the contents (all of the subdocuments) of the document clustering, for matching the user requirements of browsing the key point abstracts.

For achieving the above mentioned objectives, the steps of the disclosure include, (A) forming a database for correspondingly packing and storing each document clustering including several abstract contents and body contents of subdocuments preloaded by a user as a document clustering process record file. Each document clustering process record file records the abstract contents and the body contents of the subdocuments, and sets a document accumulation counter value, an abstract making accumulation counter value, and a success abstract making counter value. The method further includes, (B) loading the corresponding document clustering process record file according to the document clustering wished to be browsed by the user. According to the abstract contents of each subdocument of the document clustering process record file along with the document accumulation counter value, the abstract making accumulation counter value, and the success abstract making counter value, the following determination loop is executed until all of the abstract contents of subdocuments in the document clustering process record file are processed. The method further includes, (C) determining whether or not the document accumulation counter value is greater than a first threshold value; (D) calculating the abstract making accumulation counter value and the success abstract making counter value for generating an abstract making success rate; (E) determining whether or not the abstract making success rate is greater than a second threshold value; (F) determining whether or not the length of the abstract contents of the subdocument is greater than a third threshold value; (G) executing an abstract making process to the body contents of the subdocument for generating a new abstract content; and (J) outputting the new abstract content.

The document accumulation counter value, the abstract making accumulation counter value, and the success abstract making counter value may be changed according to the forming of the document clustering process record file in the database and the processing of the determination steps. According to the determination steps, steps (H) to (I), are for refreshing the document clustering process record file, thus are not listed above, the details of the steps are described below along with several embodiments. The disclosure may be able to pre-determine whether or not the original abstract contents of all the subdocuments of the document clustering are close enough to the key points of the articles before the user selects to browse the document clustering, for generating the new abstract contents which are closer to the key points of the body contents and matching the abstract browsing requirements.

The disclosure may extendedly dispose more parameters and detail determination steps to execute crossing comparison, for checking and outputting optimal abstract contents to users. For example, the step (G) may further include comparing the length the new abstract contents to the length of the (original) abstract contents of the subdocument (G1). If the length of the new abstract contents is smaller than the length of the (original) abstract contents of the subdocument, it may show that the (original) abstract contents are relatively more abundant, thus the (original) abstract contents of the subdocument are directly outputted. The step (G) may further include (G2) if the length of the new abstract contents is greater than the length of the abstract contents of the subdocument, it may show that the new abstract contents are relatively more abundant, thus the step (J) which outputs the new abstract contents which are matching the requirements of user browsing is executed.

The embodiments of the features and implementations of the disclosure are described as follows along with some figures.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The embodiments described below use the same symbol for representing the same or similar components.

The disclosure discloses the following embodiments which may be implemented by electrical equipment having the processing capabilities for digitalizing data, for example, computers and smart phones. The computers herein include but are not limited to personal computers or notebook computers. The following described methods are implemented by software.

Figure 1:
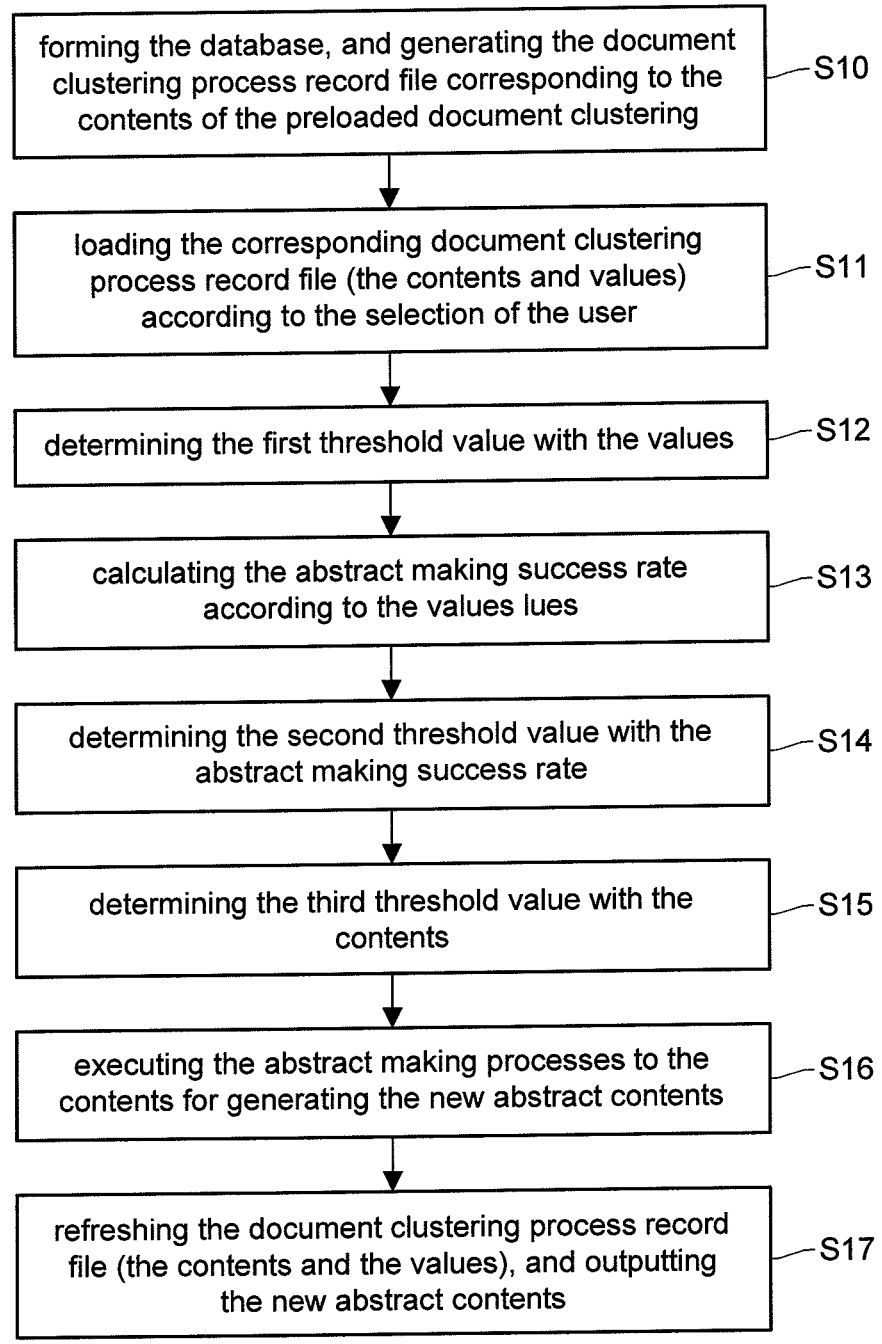
FIG. 1 shows a schematic block diagram of executing process according to a preferred embodiment of the disclosure.

FIG. 1 shows a schematic block diagram of executing process according to a preferred embodiment of the disclosure. As shown in FIG. 1, the executing processes include the following steps:

Step S10: forming the database and generating the document clustering process record file corresponding to the contents of the preloaded document clustering;

Step S11: loading the corresponding document clustering process record file (the contents and values) according to the selection of the user;

Step S12: determining the first threshold value with the values;

Step S13: calculating the abstract making success rate according to the values;

Step S14: determining the second threshold value with the abstract making success rate;

Step S15: determining the third threshold value with the contents;

Step S16: executing the abstract making processes to the contents for generating the new abstract contents;

Step S17: refreshing the document clustering process record file (the contents and the values), and outputting the new abstract contents.

According to the above steps, the steps S12 to S15 are used for carefully determining the recorded contents and values in the document clustering process record file formed thereby. If the determinations are all positive, step S16, which has the actions for abstract making, is then executed for generating new abstract contents, and step S17 is also executed for outputting the new abstract contents at the display terminal. Because the document clustering process record file records corresponding document clustering contents and sets several determination parameters for analysis, the aforementioned steps may include further cross comparison actions and add more threshold values for more careful determination steps, which acquires the needed abstract contents to users. The abstract determination processes to all the subdocuments of the document clustering content before the user browses the content of the document clustering are original and creative manners among the corresponding technical field.

Figure 2:
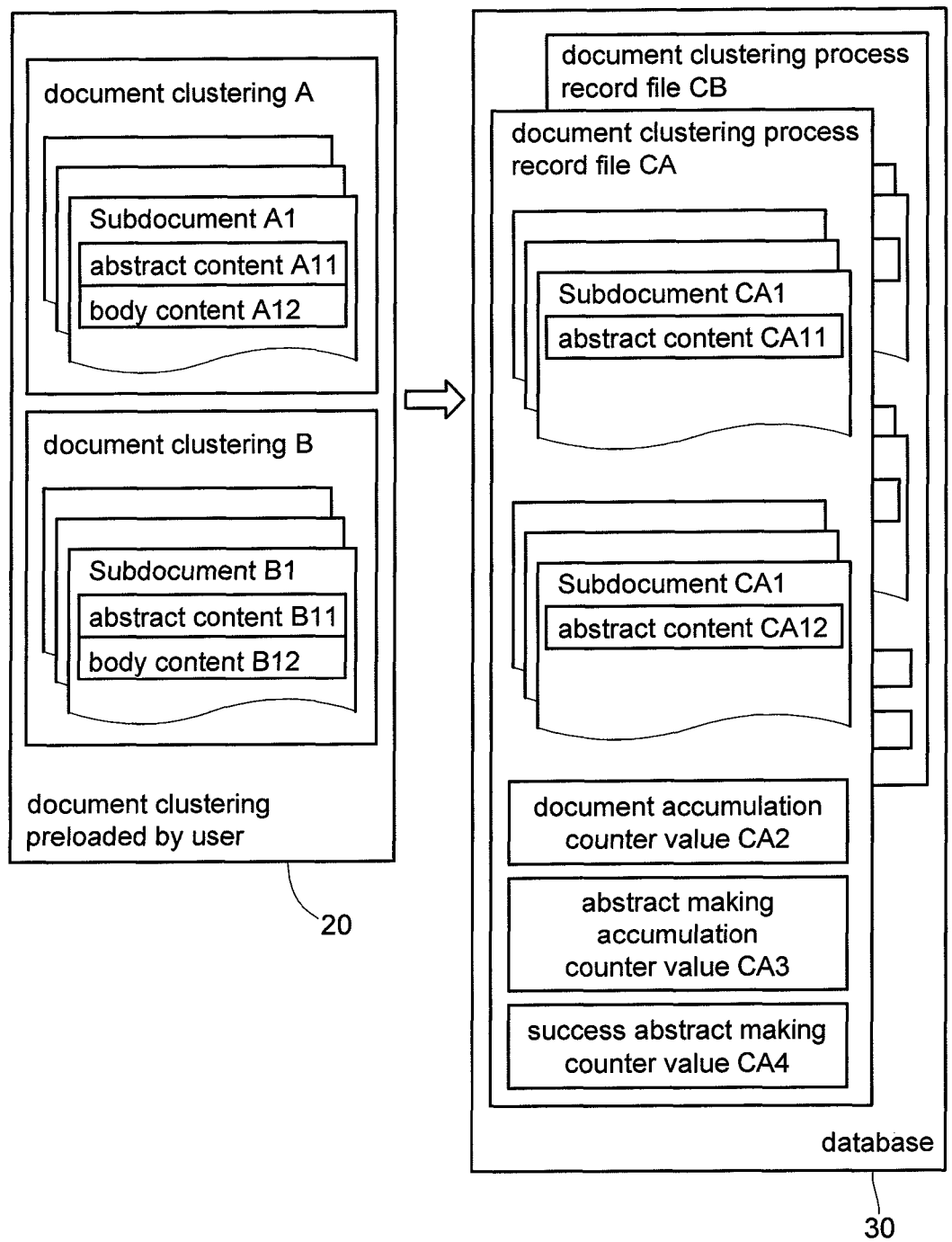
FIG. 2 shows a schematic diagram of a document clustering process record file according to a preferred embodiment of the disclosure.

In step S10 (please refer to FIG. 2), the database 30 is formed in advance, and the abstract contents and body contents of all subdocuments in the several document clusters (the document clustering A and document clustering B) are captured and packaged into corresponding document clustering process record files (the document clustering process record file CA and the document clustering process record file CB). That is, the number of the formed document clustering process record files is according to the number of the document clustering. The document clustering A includes several subdocuments (the following description uses the subdocument A1 for explanation), and the document clustering process record file CA captures and stores the abstract contents A11 and the body contents A12 of the subdocument A1 in the document clustering A as the corresponding abstract contents CA11 and body contents CA12. The document clustering process record file CA also sets a document accumulation counter value CA2, an abstract making accumulation counter value CA3, and a success abstract making counter value CA4.

Figure 3:
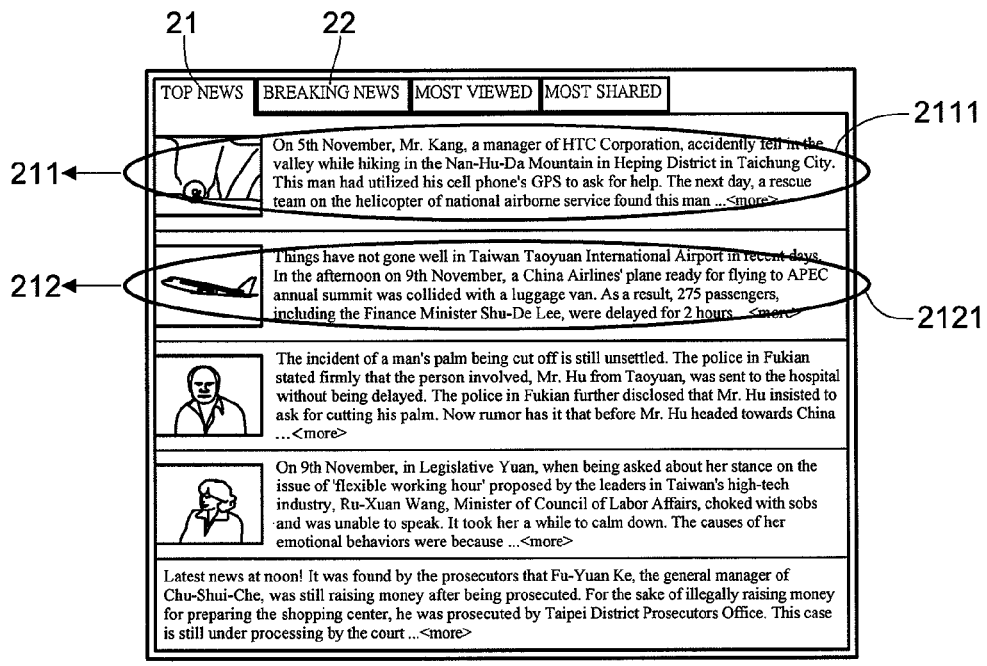
FIG. 3 shows a schematic diagram of a news webpage for explanation.

The described document clustering A is the page content of a website or the channel content of a website, which may include a news channel, a sports channel, a technology channel, an economics channel, and all kinds of similar page contents or channel contents. There may be a large amount of displayed articles in one single page content. Please also refer to FIG. 3 simultaneously, FIG. 3 uses a news website for explanation, wherein each signal page (21, 22) is a single document clustering A, B. In the document clustering A (21), several excerpted today news articles (211, which is the subdocument A1 and 212, which is the subdocument A2) are contained within for being browsed by users. However, because of the limited space of the website, the news articles are captured by only part of the texts of the whole articles (some along with pictures) as the abstract contents (that is, the abstract contents 2111 of the subdocument A1 and the abstract contents 2121 of the subdocument A2) of the corresponding articles, and the abstract contents are displayed on the page for user browsing. As shown in FIG. 3, the abstract content (2111, 2121) is generated according to parts of the body contents (which may be texts or texts along with pictures). The techniques for capturing the texts and pictures of a website are already known by one skilled in the art, and are not the key point in this disclosure, thus are not repeatedly described.

Figure 4A:
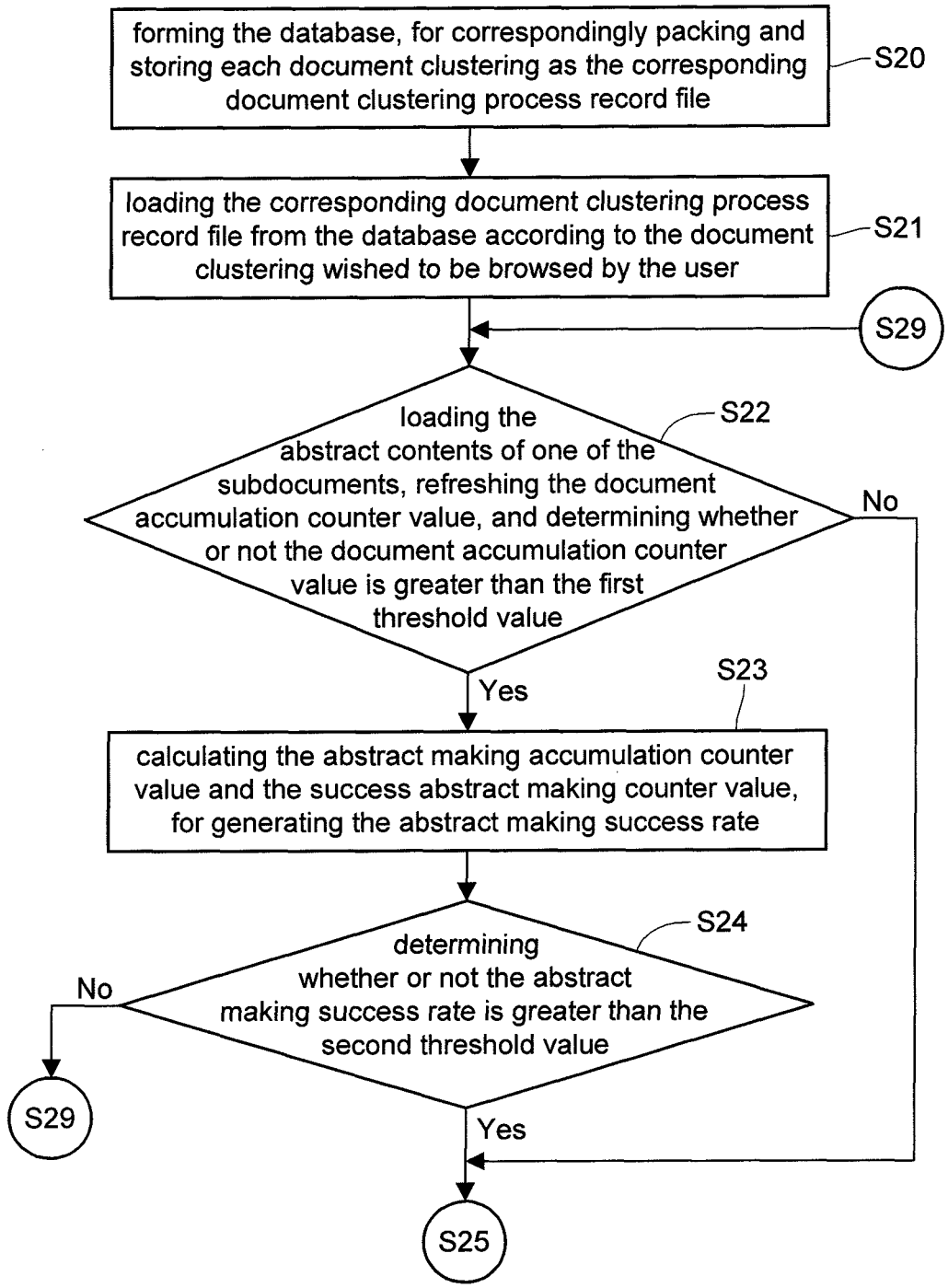
FIG. 4A and 4B show a flow chart of detailed steps according to a preferred embodiment of the disclosure.
Figure 4B:
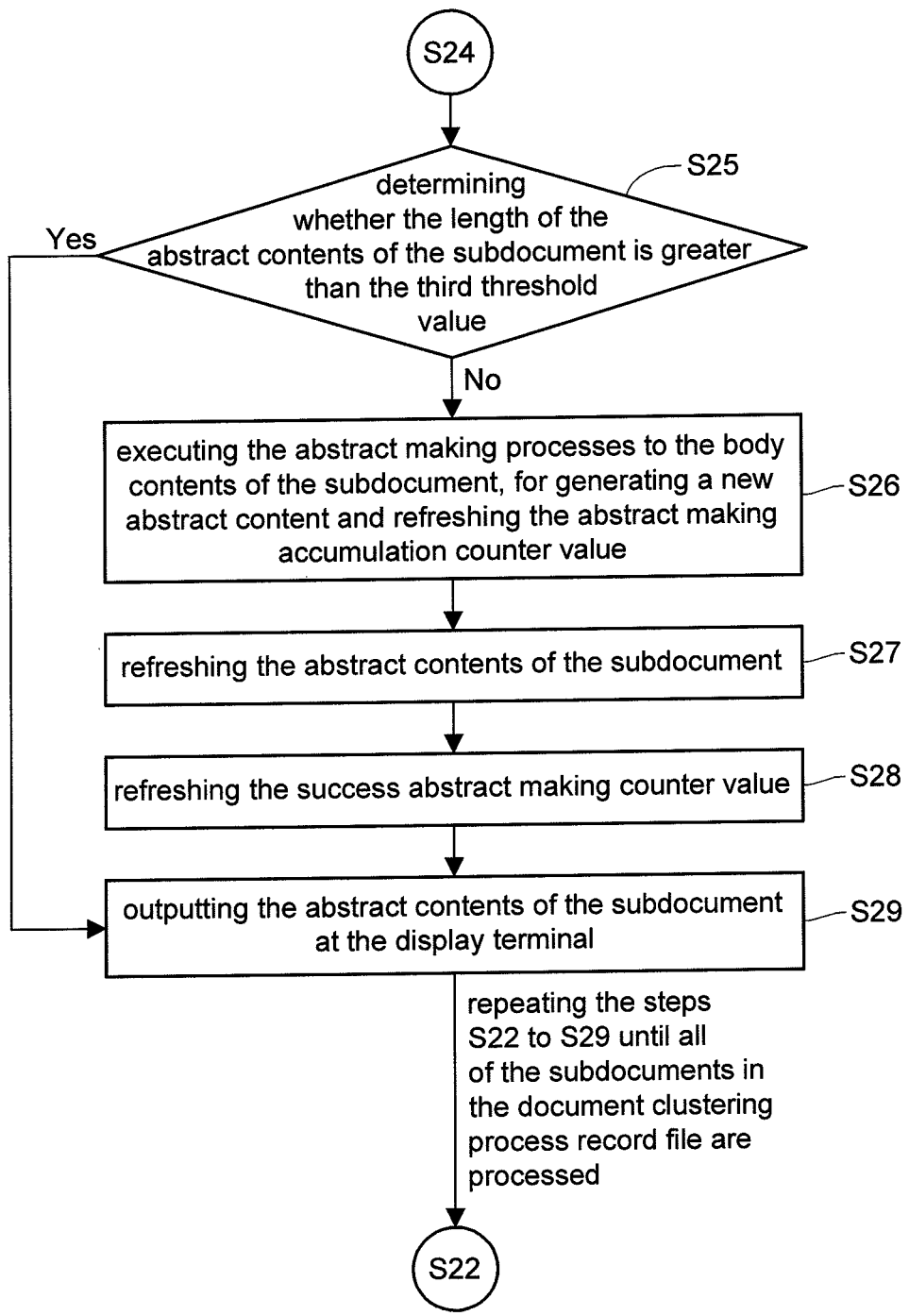

Refer to FIG. 4A and 4B which show a detailed flow chart. Step S20 includes forming a database; and packaging and storing each document clustering preloaded by users as document clustering process record files. Each document clustering has several subdocuments which include abstract contents and body contents. The disclosure uses the techniques of capturing texts and pictures on websites, disclosed above, for capturing the original abstract contents and body contents of each subdocument in the document clustering, and records them one by one in the corresponding document clustering process record files. The document clustering process record file also sets the document accumulation counter value, the abstract making accumulation counter value, and the success abstract making counter value for analysis (the implementation of step S20 may be referred to the aforementioned descriptions and FIG. 2). The setting of the document accumulation counter value, the abstract making accumulation counter value, and the success abstract making counter value are for logic determinations when the next steps are executed or when the next time they are used.

The document accumulation counter value, the abstract making accumulation counter value, and the success abstract making counter value are set at 0 at the beginning. Those parameters may change along with the execution of the following steps. The steps of the disclosure capture the abstract contents of one subdocument of the document clustering process record file at one time, thus when the abstract contents of the subdocument are captured, the document accumulation counter value is added by 1. The value records the number of processed subdocuments of the document clustering process record file, which avoids the waste of memory sources and the wrong determination, while executing the following steps, because the number of processed subdocuments of the document clustering process record file is too small. Thus, the document accumulation counter value needs to reach a predetermined number. For example, the value is compared with the first threshold value in step S22, and the following steps are executed only when the value is greater than the first threshold value.

The abstract making accumulation counter value and the success abstract making counter value respectively record the number of newly generated abstract contents and the number of new abstract contents which replace the (original) abstract contents of the subdocuments along with the execution of the steps (the details are described below).

In addition, the database continuously records the contents and values. After the user refreshes the preloaded document clustering, the database may capture and put the new contents of the document clustering from the same sources into the formed corresponding document clustering process record files, and refreshes the document accumulation counter value of the document clustering process record file. If the document clustering is from a new source and was not formed last time, a new document clustering process record file is generated. According to the mentioned database forming manners and application manners, because of the accumulated contents and refreshed determination parameters (such as the document accumulation counter value, the abstract making accumulation counter value, and the success abstract making counting value) of the document clustering process record file, the executions of the following steps S21 to S29 may acquire the determination results faster than the last time the steps were executed, and outputs better abstract contents which are closest to the key points of the body contents when the next time users select to browse the document clustering. For the convenience of explanation, the following embodiment presets the document accumulation counter value at 199 (which means that the document clustering process record file has 199 numbers of subdocument which the abstract and body contents thereof are processed), the abstract making accumulation counter value at 150, and the success abstract making counter value at 120.

After the database is formed, step S21 may load the document clustering process record file, corresponding to the document clustering from the database, before the user selects the document clustering wishing to be browsed. Then step S22 is executed for capturing the (original) abstract contents of one of the subdocuments in the document clustering process record file (the $200^{th}$ subdocument). Because one more (original) abstract contents of the subdocument is captured, the document accumulation counter value is accumulated by 1 which makes the document accumulation counter to be 200. Then the step determines whether or not the document accumulation counter value of the document clustering process record file is greater than the first threshold value. In this embodiment, the first threshold value is set to 100, it means that the document clustering process record file needs to accumulate 100 numbers of subdocument contents (abstract and body contents) for executing the determinations in step S23. If the document accumulation counter value is smaller than the first threshold value, the method then goes to step S29 for outputting the abstract contents of the subdocument. In this embodiment, the document accumulation counter value is 200, which is greater than the first threshold value 100, thus step S23 is then executed.

In step S23, the document accumulation counter value and the success abstract making counter value are calculated for generating an abstract making success rate. The calculations of the abstract making success rate in this embodiment are listed below, but the calculations may have several different kinds of combination calculations according to the determination parameters set in the document clustering process record file, and may not be limited to some specific calculation manners. The following calculations are only for example.

The abstract making success rate=the success abstract making counter value (which is 120)/the abstract making accumulation counter value (which is 150).

If the abstract making success rate in this embodiment is 0.8, Step S24 is then executed.

In step S24, the second threshold value is preset at 0.5 for being determined with the abstract making success rate calculated in step S23. If the abstract making success rate is greater than the second threshold value, step S25 is then executed. If the abstract making success rate is smaller than the second threshold value, the method then goes to step S29 for outputting the (original) abstract contents of the subdocument. In this embodiment, the calculated abstract making success rate is 0.6, which is greater than the second threshold value 0.5, thus step S25 is executed.

In step S25, the third threshold value is set at 100 for being compared with the length of the (original) abstract contents of the subdocument, in order to determine whether or not the length of the (original) abstract contents of the subdocument is long enough. If the length is greater than the third threshold value, the determination result may show that the (original) abstract contents of the subdocument is abundant enough, the following determination steps are not required, and the method goes to step S29 for outputting the (original) abstract contents of the subdocument. For the convenience of explanation, the following descriptions set the length of the (original) abstract contents of the subdocument at 50. In this embodiment, the length of the (original) abstract contents of the subdocument (which is 50) is smaller than the third threshold value (which is 100), thus step S26 is then executed.

Through the aforementioned determination steps, step S26 then executes the abstract making process to the body contents of the subdocument for generating a new abstract content. The manner of the abstract making process for generating the new abstract content includes capturing the texts and pictures of the body contents of the subdocument by special algorithms. After the calculations of the algorithms, (such as comparing the title with the body contents or calculating the weighting of paragraphs or the largest part of the article, etc.), the texts and the pictures are combined into a new abstract content. The techniques of the algorithms are known by one skilled in the art and are not the key points in this disclosure, thus are not repeatedly described. When the new abstract contents are generated, the abstract making accumulation counter value is added by 1, which means a new abstract content is generated. The method then goes to step S27 which refreshes the new abstract contents into the document clustering process record file for replacing the (original) abstract contents of the subdocument (in this step, the original abstract contents of the subdocument are covered by the new abstract contents and the new abstract contents are stored in the document clustering process record file). Step S28 may refresh the success abstract making counter value in the document clustering process record file by adding it by 1, which means the determinations of abstract contents success one more time (in order to provide references to the next steps or the next time the logic determinations of the document clustering process record file are executed). After this, step S29 is executed.

In step S29, the abstract contents of the subdocument in the document clustering process record file is outputted to the display terminal for being browsed by the users. The abstract determination processes of the subdocument in the document clustering process record file are completed. Then step S22 is repeated for capturing the (original) abstract contents of the next subdocument. After this, the determination processes in steps S22 to S29 are continuously executed until the (original) abstract contents of all subdocuments in the document clustering process record file are processed.

Figure 5:
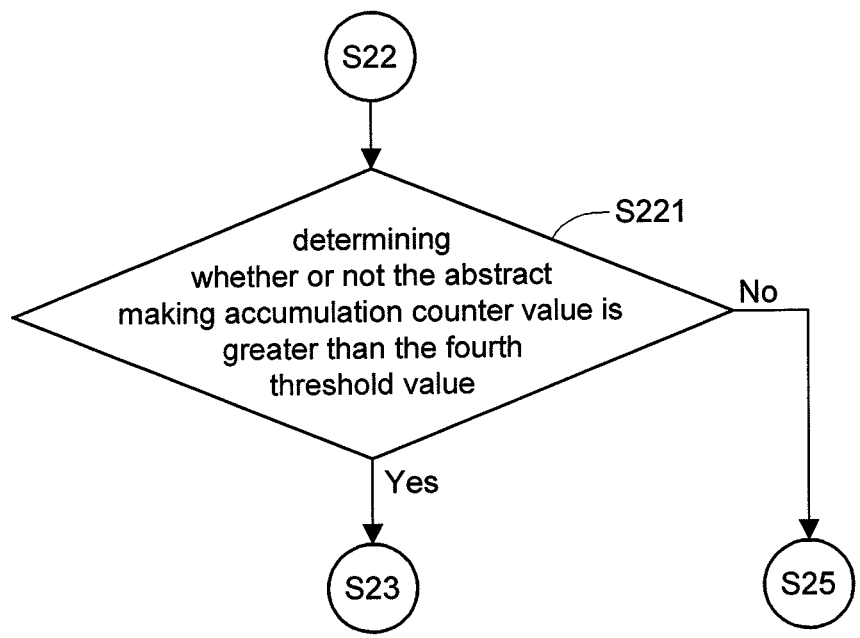
FIG. 5 shows a schematic diagram of a newly added step according to the preferred embodiment of the disclosure.

In this embodiment, new parameters may be added into the document clustering process record file for generating new combination determination or further comparisons. Please refer to FIG. 5 which is a schematic diagram of newly added steps in this embodiment. In step S22, after the determination shows that the document accumulation counter value (which is 200) is greater than the first threshold value (which is 100), a determination step S221 is added for further determining whether or not the abstract making accumulation counter value is greater than a fourth threshold value. By the double determination for determining whether or not the document accumulation counter value and the abstract making accumulation counter value are both reaching the predetermined amounts, the comparisons may be much more conscientious and careful, which avoids wasting memory calculation sources by unnecessarily executing the next steps or avoids wrong determinations of the next steps caused by accumulating way to few processed subdocuments. In this embodiment, the abstract making accumulation counter value is 150, which is greater than the fourth threshold value 20, thus step S23 is then executed.

Figure 6:
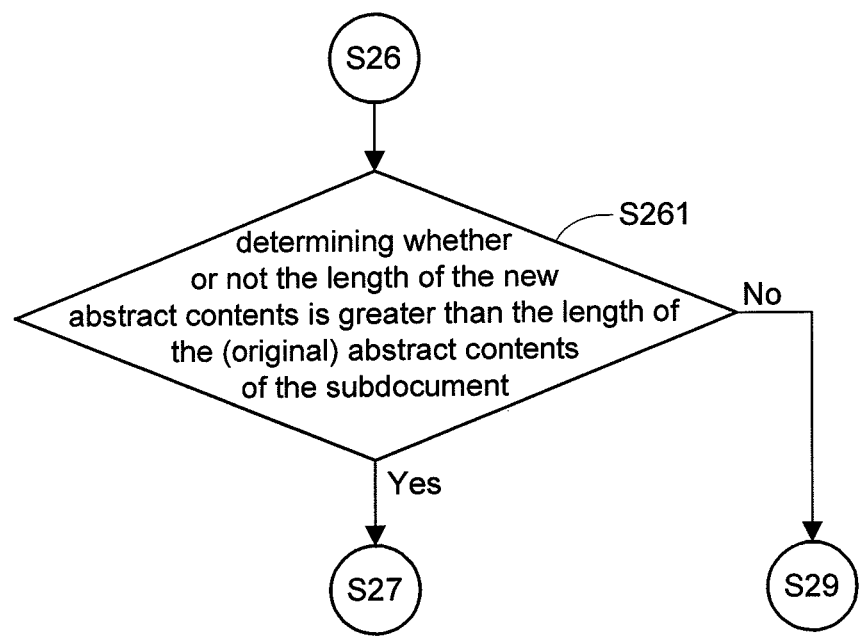
FIG. 6 shows a schematic diagram of another newly added step according to the preferred embodiment of the disclosure.

Please refer to FIG. 6 which shows a schematic diagram of another newly added step according to this embodiment. After step S26 executes the abstract making processes to the body contents of the subdocument for generating a new abstract content, a step S261 is added for further comparing the length of the new abstract contents with the length of the (original) abstract contents of the subdocument, in order to determine which is longer (much more abundant). If the length of the new abstract contents is longer, step S27 which is for refreshing the abstract of the subdocument is executed. If the length of the (original) abstract contents of the subdocument is longer than the length of the new abstract contents, step S29 for outputting the original abstract contents is then executed. By using the determination in step S261, the most suitable abstract contents may be selected, and the number of wrong determinations may be reduced. In this embodiment, supposing the length of the generated new abstract contents in step S26 is 60 and the length of the (original) abstract contents of the subdocument is 50. After the determinations and comparisons in step S261, the length of the new abstract contents is greater than the length of the (original) abstract contents of the subdocument, thus step S27 is then executed for refreshing the new abstract contents into the document clustering process record file to replace the (original) abstract contents of the subdocument. If the length of the new abstract contents is smaller than the length of the (original) abstract contents of the subdocument, the (original) abstract contents are determined to be more abundant, thus step S29 is then executed for directly outputting the (original) abstract contents of the subdocument.

Figure 7A:
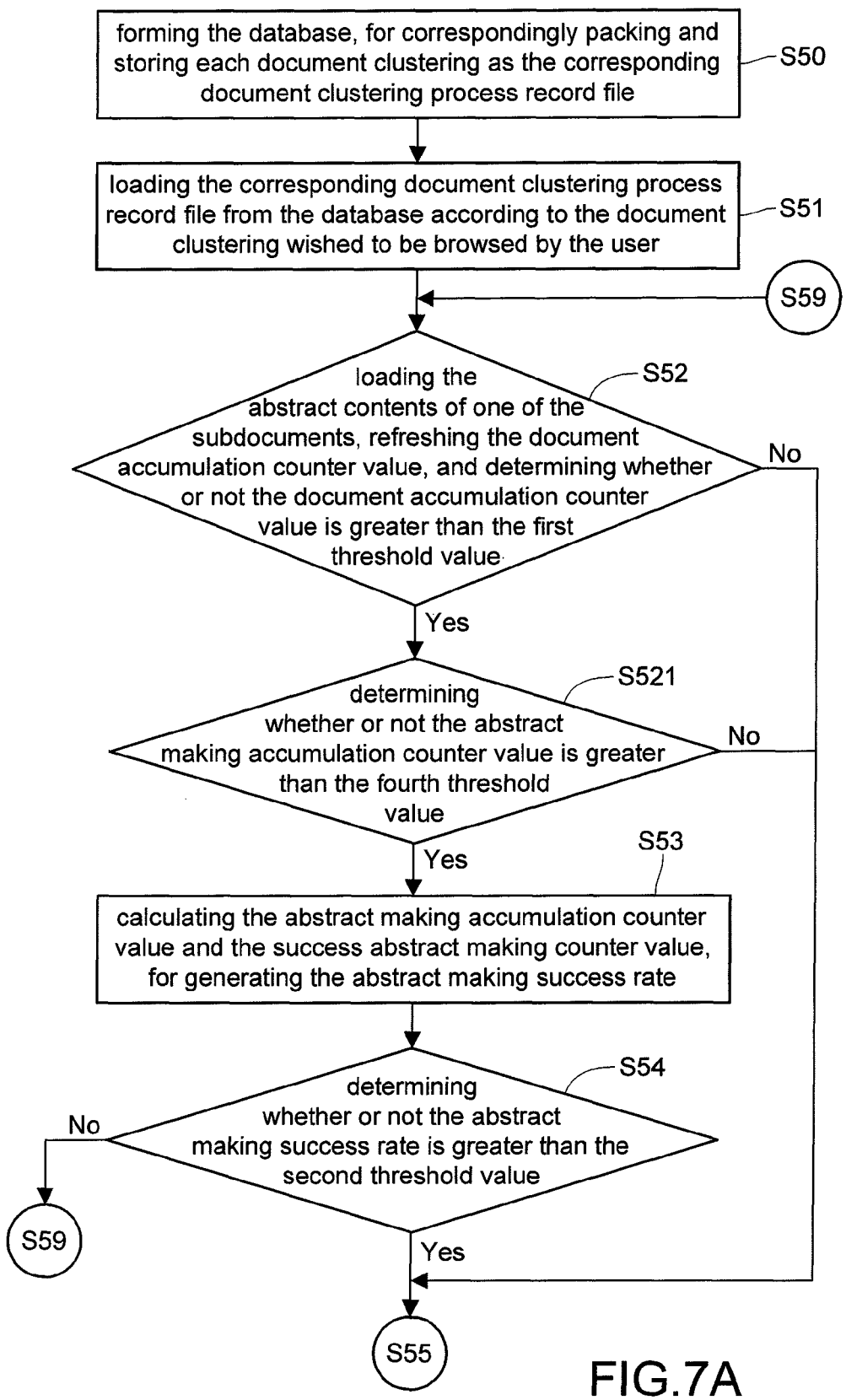
FIG. 7A and 7B show a flow chart of detailed steps according to another preferred embodiment of the disclosure.
Figure 7B:
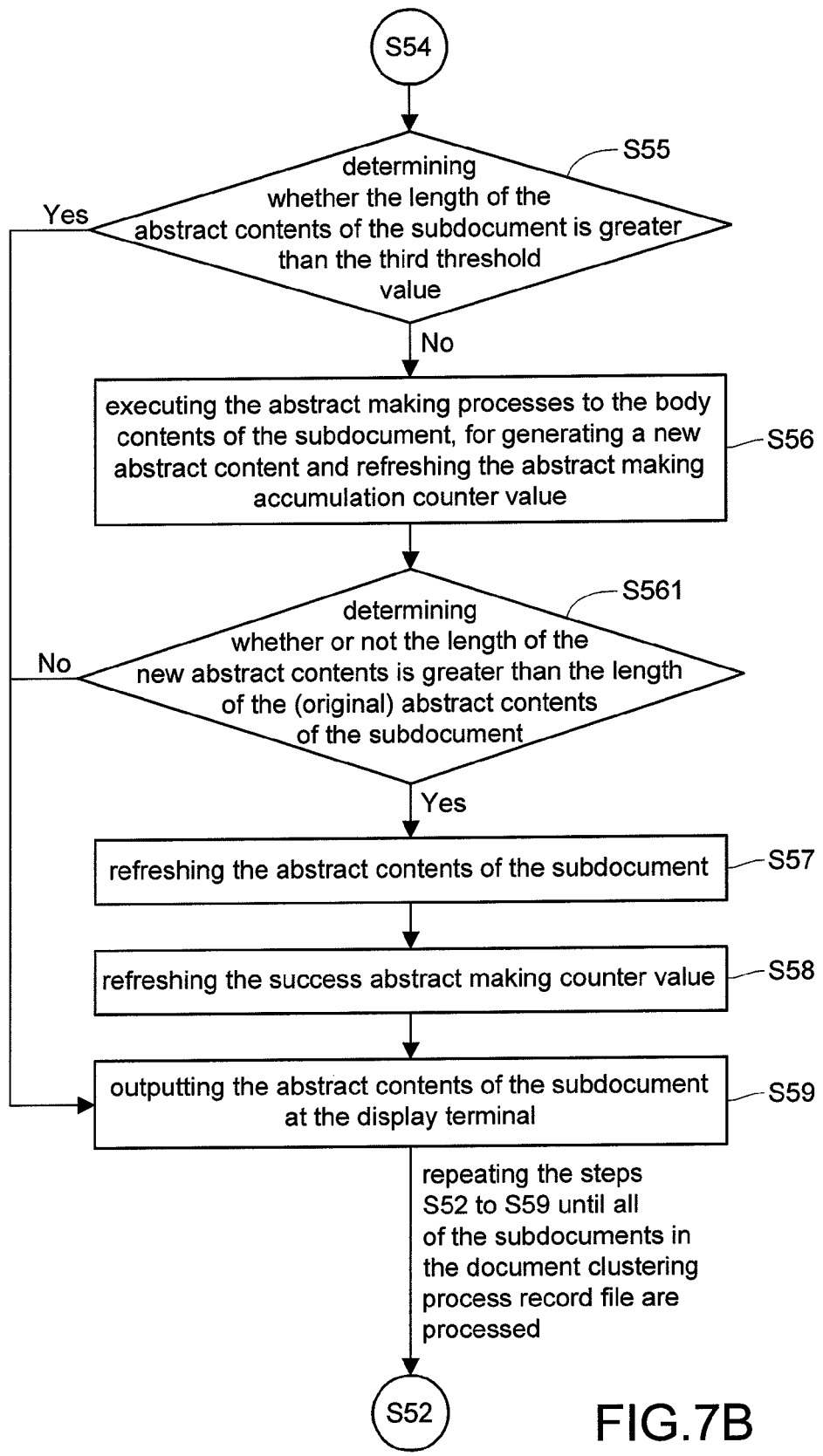
Figure 8:
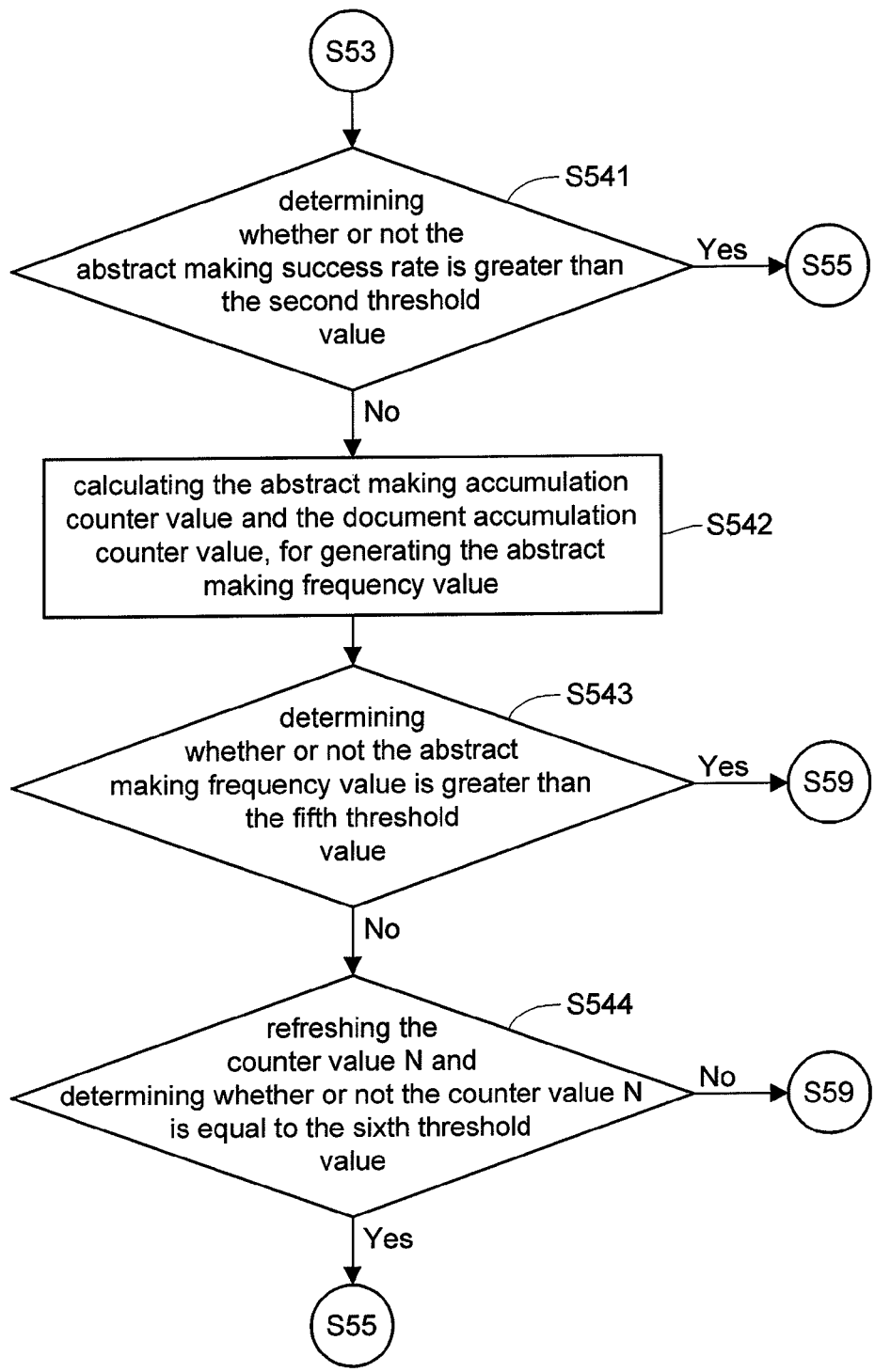
FIG. 8 shows a schematic diagram of newly added steps according to another preferred embodiment of the disclosure.

FIG. 7A and 7B show another preferred embodiment, which adds the aforementioned newly added determination steps (the steps S521 and S561) into the flow for making it a much more complete determination flow. The determination manners therein are described enough in the above descriptions, thus are not repeatedly described. For making the determination flow of the disclosure much more detailed, the output result better, and for reducing the possibility of wrong determinations, please refer to FIG. 8. In this embodiment after step S53 calculates the abstract making success rate, a detailed "reviving" determination step (that is, if the abstract making success rate is smaller than the second threshold value, before step S59 is executed for outputting the original abstract contents of the subdocument, a determination step is executed in advance for determining whether or not the subdocument with low abstract making success rate has the room for "surviving") is added into the step S54 which is for determining whether the abstract making success rate is greater than the second threshold value. The step is for increasing the abstract making success rate of the subdocument and increasing the success abstract making counter value of the document clustering process record file.

The determination steps include (step S541) determining whether the abstract making success rate is greater than a second threshold value. If the abstract making success rate is greater than the second threshold value, step S55 is executed. If the abstract making success rate is smaller than the second threshold value, the following "reviving" steps are executed:

(Step S542) calculating abstract making accumulation counter value and the document accumulation counter value, for generating the abstract making frequency value;

(Step S543) determining whether the abstract making frequency value is greater than the fifth threshold value or not, and if the abstract making frequency value is greater than the fifth threshold value, executing the step S59;

(Step S544) if the abstract making frequency value is smaller than the fifth threshold value, refreshing the counter value N and determining whether or not the counter value N is equal to the sixth threshold value, and if the counter value N does not equal the sixth threshold value, executing the step S59;

If the counter value N is equal to the sixth threshold value, the counter value N is then returned to zero, and then executing the step S55.

For the convenience of explanation, suppose that the calculated abstract making success rate in step S53 is 0.4 (the calculation manner of abstract making success rate is fully described in aforementioned embodiments) and the second threshold value is 0.5. In addition, the abstract making accumulation counter value is preset to 18 and the document accumulation counter value is preset to 200. In step S541, the abstract making success rate is 0.4 which is smaller than the second threshold value 0.5, thus step S542 is then executed. In step S542, the abstract making accumulation counter value and the document accumulation counter value are calculated for generating an abstract making frequency value. This embodiment uses the following manners to calculate the abstract making frequency value, however, the calculation manners may be designed and combined to be executed along with the determination values set in the document clustering process record file, and are not limited by any specific manners for calculating the abstract making frequency value. The following descriptions are for examples only.

The abstract making frequency value=the abstract making accumulation counter value (which is 18)/the document accumulation counter value (which is 200)

The abstract making frequency value may be acquired as 0.09. Then step S543 is executed.

In step S543, the fifth threshold value is preset to 0.1 for being compared with the abstract making frequency value calculated in step S542. If the abstract making frequency value is smaller than the fifth threshold value, step S544 is then executed. If the abstract making frequency value is greater than the fifth threshold value, the method may jump to step S59 for outputting the (original) abstract contents of the subdocument. In this embodiment, the calculated abstract making frequency value is 0.09, which is smaller than the fifth threshold value 0.1, thus step S544 is executed.

In step S544, a counter value N is set for accumulating the number of subdocuments with the abstract making success rate being smaller than the second threshold value to enter processes of "reviving" determination. The counter value is 0 at the beginning, and is added by 1 when one subdocument is processed, for comparing with a preset sixth threshold value. When the number of processed subdocuments reach the predetermined amount (the sixth threshold value), the abstract contents of the subdocument is then determined by step S55 rather than directly being outputted. Thus, the objective of random selection is achieved for increasing the number of processing the abstract contents of the subdocument in the document clustering process record file, and also for reducing the wrong determination results of not doing the next determination steps caused by the low values of the abstract making success rates of the subdocuments calculated in step S53. In this step, the sixth threshold value is set as any number between 4 and 6, and is compared with the counter value N. Thus, when the counter value N is accumulated to the fourth, fifth, and sixth subdocuments, the abstract contents of the subdocument with low abstract making success rate are further determined by the next steps, such as step S55, which achieves the objectives of random selection and "reviving" determinations.

What is claimed is:

1. An automatic abstract determination method of a document clustering, comprising:
    (A) forming a database, for correspondingly packing and storing each document clustering including a plurality of abstract contents and body contents of subdocuments preloaded by a user as a document clustering process record file, wherein each document clustering process record file records the abstract contents and the body contents of the subdocuments, and sets a document accumulation counter value, an abstract making accumulation counter value, and a success abstract making counter value;
    (B) loading the corresponding document clustering process record file according to the document clustering wished to be browsed by the user;
    (C) loading the abstract contents of one of the subdocuments, refreshing the document accumulation counter value, and determining whether or not the document accumulation counter value is greater than a first threshold value; if the document accumulation counter value is smaller than the first threshold value, executing a step (F);
    (D) if the document accumulation counter value is greater than the first threshold value, calculating the abstract making accumulation counter value and the success abstract making counter value for generating an abstract making success rate;
    (E) determining whether or not the abstract making success rate is greater than a second threshold value; if the abstract making success rate is smaller than the second threshold value, executing a step (J);
    (F) determining whether or not the length of the abstract contents is greater than a third threshold value; if the length of the abstract contents is greater than the third threshold value, executing the step (J);
    (G) if the length of the abstract contents is smaller than the third threshold value, executing an abstract making process to the body contents of the subdocument, for generating a new abstract content and refreshing the abstract making accumulation counter value;
    (H) refreshing the new abstract contents to the document clustering process record file for replacing the abstract contents of the subdocument;
    (I) refreshing the success abstract making counter value;
    (J) outputting the abstract contents to a display terminal; and
    (K) repeating the steps (C) to (K), until the abstract contents of all subdocuments in the document clustering process record file are processed.

2. The automatic abstract determination method of the document clustering according to claim 1, wherein the document clustering is a website or a channel content of the website.

3. The automatic abstract determination method of the document clustering according to claim 1, wherein the document clustering process record file further sets a counter value N.

4. The automatic abstract determination method of the document clustering according to claim 1, wherein step (C) further includes:
    (C1) determining whether or not the abstract making accumulation counter value is greater than a fourth threshold value; if the abstract making accumulation counter value is smaller than the fourth threshold value, executing step (F); and
    (C2) if the abstract making accumulation counter value is greater than the fourth threshold value, executing step (D).

5. The automatic abstract determination method of the document clustering according to claim 4, wherein the fourth threshold value is 20.

6. The automatic abstract determination method of the document clustering according to claim 1, wherein step (E) includes:
    (E1) determining whether or not the abstract making success rate is greater than the second threshold value; if the abstract making success rate is greater than the second threshold value, executing step (F);
    (E2) if the abstract making success rate is smaller than the second threshold value, executing the following steps:

(E21) calculating the abstract making accumulation counter value and the document accumulation counter value, for generating an abstract making frequency value;

(E22) determining whether or not the abstract making frequency value is greater than a fifth threshold value; if the abstract making frequency value is greater than the fifth threshold value, executing step (J);

(E23) if the abstract making frequency value is smaller than the fifth threshold value, refreshing a counter value N, and determining whether or not the counter value N is equal to the sixth threshold value; if the counter value N does not equal the sixth threshold value, executing step (J); and (E24) if the counter value N equals the sixth threshold value, returning the counter value N to zero and executing step (F).

7. The automatic abstract determination method of the document clustering according to claim 6, wherein the second threshold value is 0.5.

8. The automatic abstract determination method of the document clustering according to claim 6, wherein the fifth threshold value is 0.1.

9. The automatic abstract determination method of the document clustering according to claim 6, wherein the sixth threshold value is 4 to 6.

10. The automatic abstract determination method of the document clustering according to claim 1, wherein step (G) further includes:

(G1) comparing the length of the new abstract contents with the length of the abstract contents of the subdocument, if the length of the new abstract contents is smaller than the length of the abstract contents of the subdocument, executing step (J); and (G2) if the length of the new abstract contents is greater than the length of the abstract contents of the subdocument, executing step (H).

11. The automatic abstract determination method of the document clustering according to claim 1, wherein the abstract content is formed by text and picture.

12. The automatic abstract determination method of the document clustering according to claim 1, wherein the new abstract content is formed by new abstract text and new abstract picture.

13. The automatic abstract determination method of the document clustering according to claim 1, wherein the first threshold value is 100.

14. The automatic abstract determination method of the document clustering according to claim 1, wherein the third threshold value is 100.

* * * * *